Patented Sept. 21, 1948

2,449,671

UNITED STATES PATENT OFFICE 2,449,671

PYRETHRUM EXTRACT AND PROPELLANT SOLUTION CONTAINING IT

William W. Rhodes, Westtown, Pa., assignor to Kinetic Chemicals, Inc., Wilmington, Del., a corporation of Delaware No Drawing. Application July 30, 1943, Serial No. 496,837

5 Claims. (Cl. 167—24)

This invention relates to insecticide solutions containing pyrethrins in solvent propellants, and to methods of preparing them, and further relates to the preparation of improved pyrethrin-containing oleoresins suitable for use in manufacturing insecticide solutions. The description which follows gives an understanding of the principles of the invention, but should not be construed as a limitation.

At this point it is desirable to define the terms used in this art in order that the problems with which this invention are concerned may be easily understood. Pyrethrum flowers are the flowers of plants, such as genus Chrysanthemum cinerariae folium and others from which pyrethrins I and II may be obtained. These flowers are found in many countries and contain active insecticidal ingredients called pyrethrins, of which two have been distinguished and are called pyrethrins I and II. In order to obtain the pyrethrins from the flowers, the flowers are extracted with solvents, among which low boiling petroleum hydrocarbons are considered excellent. The mixture of solvent and dissolved matter from the flowers is called the extract. The material extracted from the flowers and separated from the solvent is called an oleoresin; it is composed of fats, waxes, resinous materials and pyrethrins I and II. Efficient extraction of pyrethrum flowers by solvent action, as practiced in the prior art, produces about 10% of oleoresins by weight, of which 12% by weight are pyrethrins, the remaining 88% being fats, waxes and resins. There are extracts available on the market in 20% concentration of active ingredients. A propellant solution is a solution of a pyrethrin extract in a highly volatile solvent. When a container which holds the propellant solution is opened, the pyrethrins are ejected in a fine mist which is called an aerosol as described in U. S. Patent 2,321,023.

In the prior art it has been the practice to prepare an extract from finely divided pyrethrum flowers with a solvent such as kerosene. This solution contains oleoresins but is not useful for dissolving in the propellant for the production of an aerosol. It has been necessary to evaporate a portion of the solvent, leaving the oleoresin dissolved in kerosene at a higher and usable concentration. To this kerosene solution was added a propellant such as $CCl_2F_2$ and a synergist such as sesame oil. When such extracts have been mixed with the propellant, a precipitation of fats and waxes took place, which had a tendency to clog the orifices of the dispensing containers. I have found that, if such a mixture is cooled to —15° C. or lower, a further precipitation occurs, which precipitate does not entirely dissolve upon reheating to room temperature.

It is an object of this invention to prepare propellant solutions containing pyrethrins which do not require processing for the removal of fats, waxes and resins, by a method which is technically and economically more satisfactory than the methods heretofore used. It is another object of the invention to prepare propellant solutions of pyrethrins which produce aerosols that are more deadly to insects than those now known. It is a further object of this invention to produce an oleoresin having a higher pyrethrin content than those previously obtained in a single extraction.

The objects of the invention are accomplished, generally speaking, by extracting the pyrethrins from pyrethrum flowers with a particular class of solvents which may be used as the propellants. In accomplishing the objects of the invention I have discovered a class of solvents which show better extraction efficiency or better extraction selectivity, or both, than any of the solvents known to the prior art. These extracts may be used directly for the production of aerosol or may be evaporated to obtain improved oleoresins.

In the practice of a preferred form of my invention I extract pyrethrum flowers with a fluoro-chloromethane or ethane, which is gaseous at atmospheric temperature and pressure, and use the extract so prepared directly as a propellant solution. The concentration of the extract may be varied by adding or removing solvent. Synergists, such as sesame oil, may be added to increase the activity of the pyrethrins. Within the broad scope of the invention are two solvents which have outstanding and preferred characteristics, constituting in effect a particular invention. These solvents are $CHClF_2$ and $C_2HClF_4$, the boiling point of the former of which is —40.8° C. and the boiling point of the latter of which is —10.2° C. The oleoresins obtained by extracting pyrethrum flowers with these two solvents are characterized by greater pyrethrin content and proportionably lower content of fats, waxes and resins than oleoresins obtained by evaporation of prior art extracts. In addition, these oleoresins when dissolved in $CCl_2F_2$ show no precipitation at normal temperatures.

In the experiments leading up to the invention, two extraction methods were used, which will be briefly described:

METHOD 1

When solvents boiling above room temperature were used, Soxhlet type apparatus was employed for extraction. Twenty-five parts of pyrethrum flowers were mixed in the Soxhlet extraction apparatus with 450 parts of solvent, and the extraction was carried on for 24 hours. The solvent was evaporated, the residue was heated at 100° C. for 10 minutes under 200 mm. Hg pressure and was weighed. Usually this procedure was sufficient to remove all the solvent from the extracted material. The percentage of pyrethrins present in the oleoresin was determined by the Seil method. (Soap Blue Book, p. 192 (1942).)

METHOD 2

For solvents boiling below room temperature at atmospheric pressure, pressure autoclaves with means for agitating the contents were used for extraction. Twelve and one-half parts of pyrethrum flowers were placed in the autoclave with 150 parts of solvent and digested at 45° C. for 24 hours with agitation. After this period the extract was separated from the exhausted flowers and 100 parts more of solvent was added to leach out any unextracted pyrethrins. After two hours, this weaker extract was removed, the two extracts were combined, the solvent was evaporated, and the extracted material was isolated in a manner similar to that described above.

The results of a representative series of such extractions are shown in Table 1.

TABLE I

Extraction of Kenya Colony Pyrethrum with various solvents

| Exp. No. | Solvent | Ext. method | Per cent Oleoresin from Flowers | Per cent Pyrethrins Extracted from Flowers[1] | Efficiency Flowers per Pyrethrins | Selectivity Oleoresin per Pyrethrins |
|---|---|---|---|---|---|---|
| 1 | Acetone | 1 | 15.8 | 1.00 | 100 | 14.8 |
| 2 | Pet. ether | 1 | 10.0 | 1.20 | 83 | 7.3 |
| 3 | do | 2 | 7.0 | 0.90 | 111 | 6.8 |
| 4 | $CHCl_3$ | 1 | 15.2 | 1.10 | 91 | 12.8 |
| 5 | $CCl_4$ | 1 | 12.0 | 1.04 | 96 | 10.5 |
| 6 | $C_2H_4Cl_2$ | 1 | 16.0 | 1.06 | 94 | 14.5 |
| 7 | $CCl_3F$ | 1 | 7.2 | 1.00 | 100 | 6.2 |
| 8 | $CCl_2F_2$ | 2 | 7.2 | 0.80 | 125 | 8.0 |
| 9 | $CHCl_2F$ | 2 | 6.4 | 0.80 | 125 | 7.0 |
| 10 | $C_2Cl_2F_4$ | 2 | 5.6 | 0.83 | 120 | 5.7 |
| 11 | $CHClF_2$ | 2 | 6.4 | 1.13 | 89 | 4.7 |
| 12 | $C_2HClF_4$ | 2 | 7.2 | 1.20 | 83 | 5.0 |

[1] The average pyrethrin content of the dried flowers is about 1.2% by weight according to the Seil method.

To illustrate an advantage of our invention, the extraction with $CHClF_2$ and $C_2HClF_4$ will be compared with the extraction with petroleum ether, which is one of the most efficient solvents known in the prior art. Petroleum ether extraction is more efficient when carried out by the first of the two extraction processes described above. Therefore, results by that better method are used for purposes of comparison:

EXAMPLE I

Petroleum ether extracted 10% of oleoresins from the pyrethrum flowers; 12% of the oleoresins were pyrethrins, the other 88% of the oleoresins were waxes, fats, and resins. Before being used in a propellant solution, it was necessary to partially remove fats, waxes, and resins from the extract. It was necessary to complete this purification by cooling the solution of the oleoresin in $CCl_2F_2$ in order to prevent subsequent clogging of orifices.

$CHClF_2$ was employed for the extraction and 6.4% of oleoresins were obtained; 19.8% of the oleoresins were pyrethrins. This showed great selectivity of the solvent for pyrethrins compared to petroleum ether. Furthermore, it was not necessary to remove the fats, waxes, and resins to permit the use of this oleoresin directly in a propellant solution. When $C_2HClF_4$ was used for the extraction, 7.2% oleoresins were obtained, of which 16.6% were pyrethrins. This also showed better selectivity than petroleum ether, and it was also not necessary to remove the fats, waxes, and resins.

The following table gives an excellent comparison:

|  | Per cent Oleoresin Extracted from Flowers | Per cent Pyrethrins in Oleoresin | Efficiency Flower per Pyrethrins | Selectivity Oleoresin per Pyrethrins |
|---|---|---|---|---|
| Petroleum Ether | 10 | 12 | 83 | 7.3 |
| $CHClF_2$ | 6.4 | 17.6 | 89 | 4.7 |
| $C_2HClF_4$ | 7.2 | 16.5 | 83 | 5.0 |

EXAMPLE II

*Illustrating the problems arising during the preparation of prior art propellant solutions*

Definite amounts of a commercial 20% kerosene pyrethrin extract and sesame oil were placed in a high-pressure glass vessel and then evacuated. Sufficient $CCl_2F_2$ was then added to make a solution of the following composition:

| | Percent by weight |
|---|---|
| $CCl_2F_2$ | 93 |
| Pyrethrins I and II | 1 |
| Sesame oil | 2 |
| Inert—kerosene | 4 |

Immediate precipitation of insoluble fats and waxes took place at room temperature. The solution was filtered at room temperature, the insoluble material amounting to about 10% of the total extract used. Part of the filtered solution was then placed into another pressure tube in contact with an iron strip. After 5 days standing, precipitation of dark and gummy substances began to take place on the iron strip, while the original filtered solution remained unchanged. A portion of this original filtered solution was subjected to cooling at −15° C. for one-half hour, and filtered. An additional 10% of the total extract precipitated. This solution remained clear in the presence of the iron strip even after 8 months' standing.

Iron was used in these tests to simulate actual conditions under which the solutions are shipped and used. Cooling and filtering of the solution to at least −15° C. for some time were necessary to prevent subsequent precipitation of waxes and fats seemingly due to the effect of iron.

EXAMPLE III

*Illustrating direct extraction with a propellant solvent*

Exactly 150 g. of powdered pyrethrum flowers (assaying 1.2% pyrethrins by the Seil method) was extracted with $CCl_2F_2$ under pressure at 45° C. The oleoresin obtained from the extraction contained 1.35 g. of pyrethrins I and II. The required amount of $CCl_2F_2$ was added to this oleoresin to make a 1% solution of pyrethrins I and II, and checked by analysis of the active constituents by the Seil method.

This solution was used in comparison tests with other solutions of pyrethrum extracts in Peet-Grady chamber tests on common houseflies. The results are tabulated in Table II.

TABLE II
RESULTS OF PEET-GRADY TESTS

| Solution | "Drop" in 15 Min. | "Kill" |
| --- | --- | --- |
| Official Test Insecticide 12 mg. pyrethrins/1 cc | 100 | 62 |
| $CCl_2F_2$ extract, 10 mg. pyrethrins/1 cc | 99 | 81 |
| $CCl_2F_2$ extract, 10 mg. pyrethrins/1 cc.+20 mg. sesame oil/1 cc | 98 | 90 |
| Commercial Kerosene Extract [1] in $CCl_2F_2$, 10 mg. pyrethrins/1 cc.+20 mg. sesame oil/1 cc | 98 | 82 |

[1] Commercial extract contained 20% pyrethrins in kerosene. This extract was found by our tests to be superior to any other extracts now commercially available.

The "kill" obtained through the use of aerosols from our $CCl_2F_2$ extracts show these solutions to be superior to those prepared from any of the commercial extracts. This is one of the advantages gleaned through the use of at least some of the fluoro-chloro methanes and ethanes. The advantage may arise from a preferential extraction of the pyrethrins over other extractable inert materials which may have a tendency to neutralize the insecticidal properties of the pyrethrins.

EXAMPLE IV

One hundred and fifty parts ground pyrethrum flowers were percolated and extracted with sufficient $CCl_2F_2$ (B. P. −30° C.) under pressure and at a temperature of 40° C. to remove substantally all of the active ingredients. After extraction, the extract was cooled to about −15° C. for about one-half hour to one hour and the solution filtered. The extract was then analyzed for the active ingredients and $CCl_2F_2$ added or distilled off to bring the extract to the desired concentration for direct use. This process obviated the necessity of using an oleoresin obtained by the use of other solvents in the preparation of $CCl_2F_2$ insecticide solution. By this method also, insecticidal solutions were obtained which do not precipitate waxes and fats at room temperature or further cause precipitation of fats and waxes upon long standing in iron containers due to the catalytic activity of iron.

The other fluoro-chloro-methanes and ethanes showed advantages in at least one respect over the solvents of the prior art, but the advantages in some other respects were not as great over petroleum ether as are the advantages of $CHClF_2$ and $C_2HClF_4$. $CHClF_2$ and $C_2HClF_4$ far excel any known solvents for combined efficiency and selectivity of the solvents for the pyrethrins. The extracts obtained by the use of my new process have the advantage that they can be used directly as insecticide solutions for producing aerosols, since they do not precipitate waxes and resinous materials. They have the added advantage of producing aerosols having higher kill. Among the solvents of my invention which were tested and found superior in at least one regard to the solvents of the prior art are $CCl_3F$, $CCl_2F_2$, $CHCl_2F$, and $C_2Cl_2F_4$.

My method of extraction may be used not only for the preparation of propellant solutions, but for the preparation of these pyrethrum concentrates which constitute an article of commerce. Those concentrates are made by treating the pyrethrum flowers with the selected solvent to extract the oleoresin. The extract is reduced to a standard concentration and the concentrate is sold to organizations which manufacture insecticides. The purchaser of the concentrate, if he is making a propellant solution, dissolves the concentrate in the proper amount of propellant. Heretofore the concentrates were frequently made by evaporating the extraction solvent and dissolving the oleoresin in kerosene. The concentrate was dissolved by the user in a propellant such as $CCl_2F_2$. In accordance with our invention, the concentrate may be made from a selected amount of extract with sesame oil and with or without a small percentage of high-boiling solvent, such as kerosene. The essential nature of such concentrates is quite different from that of the concentrates of the prior art, and results of their use are superior.

I do not intend to limit myself to a particular mode of extraction, or to the temperature or the duration of the extraction process. In general, I have found that higher temperatures make for more complete extraction of the active ingredients and for less pure extracts. I also do not wish to limit myself to the use of single solvents. Mixtures of various fluorinated solvents may also be used. Direct extractions may be made with my solvents and the mixture diluted or concentrated to the exact strength required for the preparation of a standard insecticidal solution for aerosol use.

Extracts and propellant solutions prepared by this process have a high concentration of active pyrethrins and a minimum amount of waxy or resinous material. Propellant solutions made with oleoresins prepared in this manner are substantially free of precipitates at room temperature when made into the standard aerosol formula with $CCl_2F_2$. Oleoresins of the prior art contain an objectionable substance of green color. Oleoresins made by my process, particularly using $C_2HClF_4$ or $CHClF_2$, yield extracts and propellant solutions substantially free from that objectionable substance.

As many apparently widely different embodiments of this invention may be made without departing from the spirit and scope thereof, it is to be understood that I do not limit myself to the specific embodiments thereof except as defined in the appended claims.

I claim:

1. An extract consisting of a fluorinated solvent from the class consisting of $CHClF_2$ and $C_2HClF_4$ the boiling point of which is −10.2° C. and the parts of pyrethrum flowers soluble therein.

2. An extract consisting of a fluorinated solvent comprising $CHClF_2$ and the parts of pyrethrum flowers soluble therein.

3. An extract consisting of a fluorinated solvent comprising $C_2HClF_4$ the boiling point of which is $-10.2°$ C. and the parts of pyrethrum flowers soluble therein.

4. A propellant solution substantially free from green coloring matter whose essential ingredients are a fluoro-chloro derivative of an aliphatic hydrocarbon of the group consisting of methane and ethane, gaseous at atmospheric temperature and pressure, only those parts of pyrethrum flowers soluble in a solvent of the group consisting of $CHClF_2$ and $C_2HClF_4$ which has a boiling point of $-10.2°$ C. and as a minor constituent sesame oil.

5. The process of preparing a propellant solution which comprises extracting pyrethrum flowers with a solvent from the class consisting of $CHClF_2$ and $C_2HClF_4$, the boiling point of which is $-10.2°$ C.

WILLIAM W. RHODES.

REFERENCES CITED

The following references are of record in the file of this patent:

UNITED STATES PATENTS

| Number | Name | Date |
| --- | --- | --- |
| 2,321,023 | Goodhue | June 8, 1943 |

OTHER REFERENCES

Gnadinger: Pyrethrum Flowers, 2d ed., published in 1936 by McLaughlin Gormley King Co., Minneapolis, Minn., pages 200 and 201.